June 24, 1941.  E. D. DALL  2,246,789
AUTOMOBILE HOOD LATCH
Filed Aug. 17, 1940  3 Sheets—Sheet 1
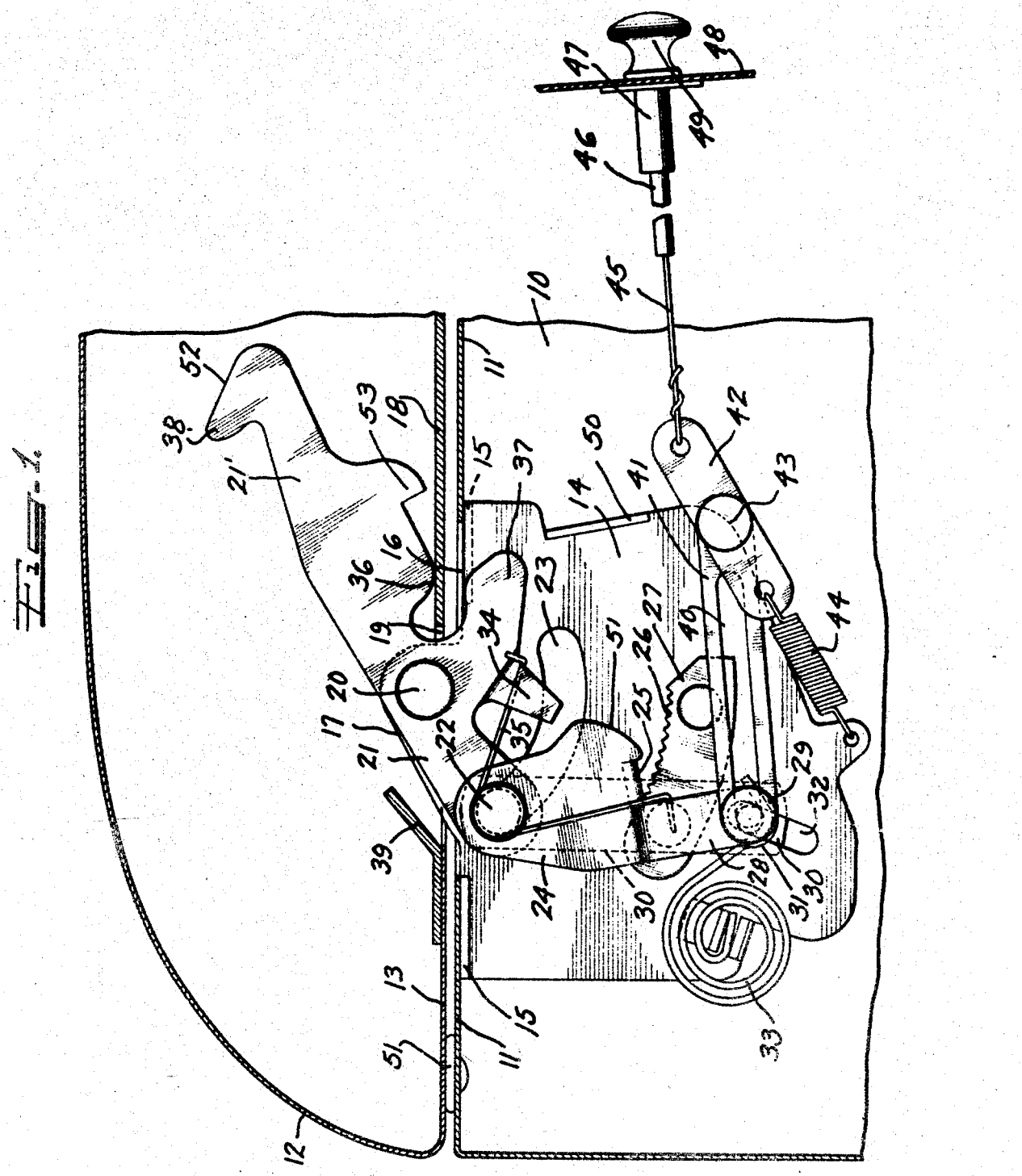
Inventor
EDWARD D. DALL.

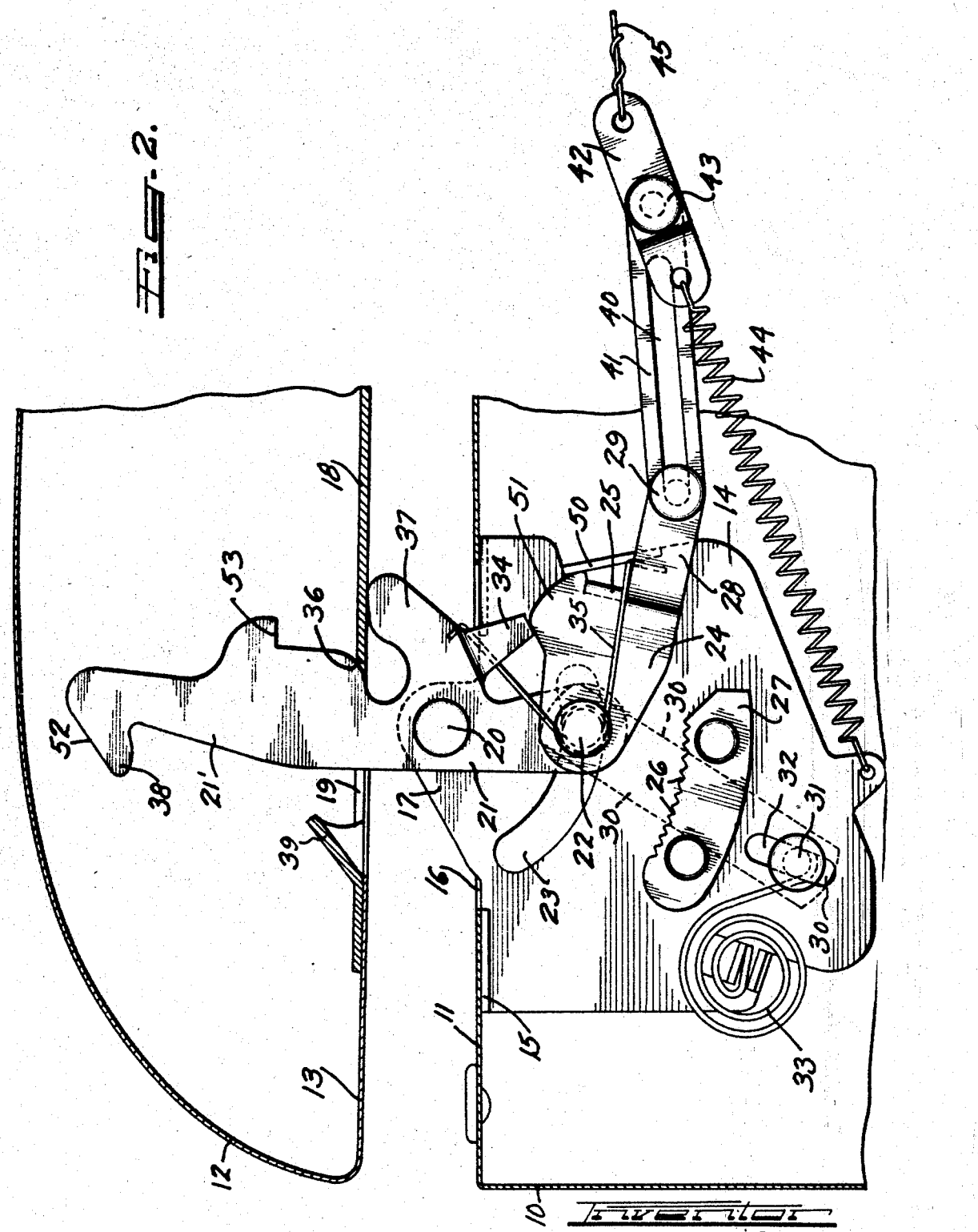

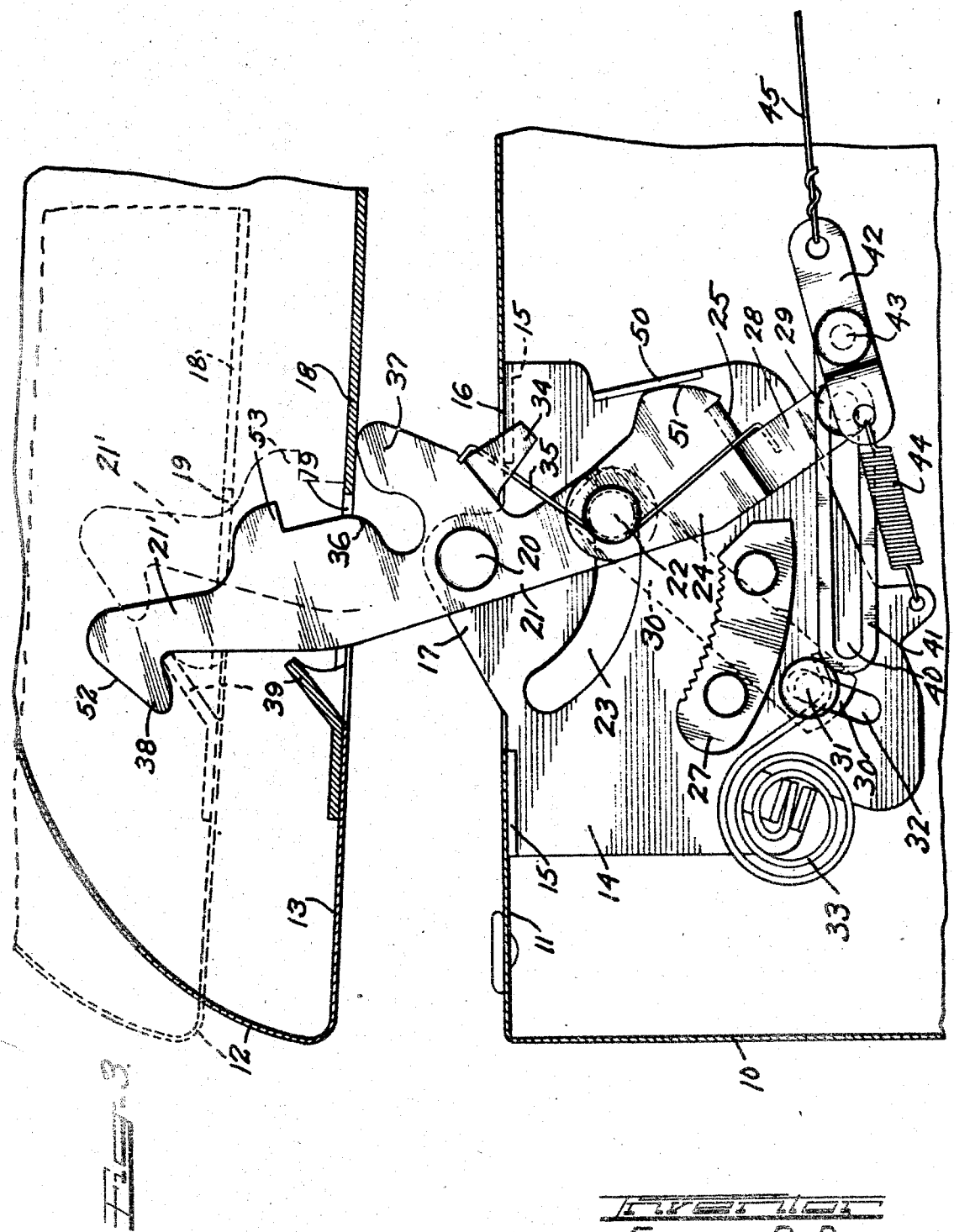

Patented June 24, 1941

2,246,789

UNITED STATES PATENT OFFICE 2,246,789

AUTOMOBILE HOOD LATCH

Edward D. Dall, Detroit, Mich., assignor to Houdaille-Hershey Corporation, Detroit, Mich., a corporation of Michigan Application August 17, 1940, Serial No. 353,007

6 Claims. (Cl. 292—117)

My invention relates to automobile hood latches and is adapted particularly for latching hoods of the so-called "alligator" type. My improved latching mechanism is of the type embodying a main latch and a safety catch and with the operation of the main latch such that when it is moved in unlatching direction it will effect a partial opening of the hood cover, whereafter the safety catch will prevent full opening of the cover until the catch is moved to released position.

An important object of the invention is to provide an arrangement in which the operation of the main latch and the safety catch may be controlled entirely by the driver from within the vehicle body, so that the driver may determine just when the hood cover is to be released for full opening.

Another important object of the invention is to provide for sequential operation of the latching means by manipulation of control means within the vehicle body, the arrangement being such that, by a first manipulation of the control means, the main latch will unlatch the hood cover and cause a partial opening thereof and the safety catch will be moved into catching position to prevent full opening movement of the cover, and with a second manipulation of the control resulting in withdrawal of the safety catch for full opening of the cover and then return of the latching mechanism to fully unlatched condition and in position to be engaged by the cover during closure movement thereof, to be automatically moved back to latching position to lock the cover closed.

Another object of the invention is to produce a latching assembly in which substantially all of the parts are in the form of simple stampings of sheet metal which can be readily and economically assembled and installed in a vehicle.

The various features of my invention are incorporated in the structure shown on the drawings, in which drawings—

Figure 1 is a side elevation of the latching assembly in its latching position, a part of the vehicle hood and cover being shown in longitudinal section;

Figure 2 is a view similar to Figure 1, showing the main latching mechanism partly unlatched and with the cover partially raised thereby, but with the safety catch still in inoperative position;

Figure 3 is a view similar to Figure 1, showing the main latch mechanism fully released and the safety catch in position to limit the further opening movement of the hood cover.

As shown on the drawings, the hood body 10 is provided with a ledge or shelf 11 extending transversely across the hood at the front end thereof, and the hood cover 12 is provided with the ledge or shelf 13.

The latching and controlling elements are mounted on a supporting plate 14 extending in a vertical plane substantially midway between the sides of the hood body and having horizontal deflected ears 15 secured as by riveting or welding against the under side of the shelf 11 for supporting the plate securely in position. The upper edge of the plate 11 is adjacent to a slot or passageway 16 through the shelf 11 and through this passageway projects the upward extension 17 of the plate 14. Extending transversely of the cover 12 and mounted on the flange 13 thereof is an abutment plate or wall 18 having the passageway 19 through which the extension 17 projects when the cover is in closed position.

Secured on the extension 17 of the supporting plate 14 is a stud 20 which fulcrums the latch lever or bolt structure 21. Extending from the lower end of the lever 21 is a stud 22 which, when the lever is rotated, travels along the arcuate slot 23 in the plate 14, which slot has a center in the axis of the fulcrum pin 20. A detent pawl 24 is mounted at its upper end on the stud 22 for swinging movement thereon and this pawl has a detent tongue or tooth 25 deflected therefrom for cooperation with the detent teeth 26 on a rack 27 mounted on the plate 14 with the teeth in an arcuate row concentric with the slot 23. The pawl has a depending arm 28 mounting at its end a headed stud 29.

At the side of the plate 14 opposite to the side on which the pawl 24 is located, is a link 30 receiving at its upper end the stud 22 and at its lower end being secured to a headed guide pin 31 extending through the guide slot 32 in the plate 14, a spiral spring 33 anchored on the plate 14 engaging the pin 31 and arranged to exert longitudinal upward pressure on the link 30. The arrangement is such that when the stud 22 is moved along the slot 23 from either end of the slot, the stud will pass through the spring pressure center line extending through the fulcrum 20 and the pin 31, so that after movement of the stud past the center line the spring will become effective to quickly move the stud to the respective end of the slot 23.

An abutment finger 34 on the lever 21 extends into the plane of movement of the pawl 24 and a hairpin spring 35 anchored on the stud 22 engages at its ends with the abutment 34 and the pawl arm 28 and tends to swing the pawl and lever apart so that, when the latch lever is in latching position, as shown on Figure 1, the pawl will be swung by the spring with its detent tooth 25 into engagement with a detent tooth 26 to lock the latch bolt against swing in unlatching direction. When pull is exerted on the pawl 24 to swing it in counterclockwise direction, it will first be released from the detent rack 26 and will then engage the abutment 34 on the latch lever for swing of the latch lever in unlatching direction, all in a manner to be fully described hereinafter.

When the hood cover 12 is closed, or only partially opened, the latch lever structure 21 projects through the passageway 19 in the keeper wall 18 of the cover. Outwardly of its fulcrum point 29 the lever has the latching abutment or shoulder 36 and below this shoulder the lever has the arm 37 which becomes effective to partially raise the hood cover when the latch lever is swung in unlatching direction.

When the latch is in latching position, as shown on Figure 1, with the stud 22 at the outer end of the slot 23, the latching shoulder 36 on the latching lever structure will abut against the top of the keeper plate 18, and the force of the spring 33 against the lever will cause it to hold the hood cover securely in closed position, the lever structure 21 being locked in this latching position by the engagement of the pawl tooth 25 with one of the rack teeth 26.

The outer end 21' of the latch lever 21 functions as a safety catch and terminates in the hook end 38 for cooperation with the keeper lip 39 deflected from the keeper plate 18 on the hood cover.

Describing now the control means for the latching mechanism, the pin 29 on the pawl arm 28 is received in the elongated slot 40 in a link 41. A bar 42 is pivoted intermediate its ends on a pin 43 secured to the outer end of the link 41, the inner end of the bar 42 being connected by a tension spring 44 with the plate 14, and the outer end of the bar being connected by a cable or wire 45 with a pull-rod 46 slidable in a fitting 47 secured to the vehicle dashboard or instrument board 48, the rod 46 terminating in a knob or button 49. Upon the exertion of pull on the button 49, the link 41 is caused to swing the pawl 24 for release thereof from the detent teeth 26 and for engagement thereof with the abutment 34 on the latch lever structure 21 so that the latch lever structure will be rotated in unlatching direction. An abutment wall 50 is deflected laterally from the plate 14 for engagement by the pawl when the button 49 and the link 41 are pulled out.

Figure 1 shows the hood cover closed and the latch lever structure held against the keeper wall 18 by the force of the spring 33, it being noted that during such latching position the stud 22 is a distance away from the outer end of the slot 23, so that spring pressure may continue against the latching lever for holding the cover tightly closed against rattling. To avoid metal-to-metal contact between the cover and the hood body, rubber pads 51 may be provided on the seating shelf 11 of the body. For effecting release of the cover so that it may be swung open for access to the interior of the hood body, the button 49 is first pulled out for swing of the pawl 24 to release the latch lever 21 and to swing it in unlatching direction. This outward pull of the button 49 and link 41 is limited by the engagement of the edge 51 of the pawl with the stop abutment 50, as shown on Figure 2, and so long as the button is held out, this position of the parts will be maintained. During swing of the lever 21 by the pawl, the lever arm 37 is engaged with the abutment wall 18 of the cover to effect partial raising of the cover, but the swing of the lever is not sufficient to fully disengage the latching shoulder 36 from the abutment wall 18, so that the cover will be latched against further upward movement after partial raising thereof by the arm 37. The movement of the latch lever 21 to the intermediate position shown on Figure 2 was rapidly accomplished by the force of the spring 31 after the stud 22 passed through the neutral pressure line of the spring when the button 49 was pulled out.

By holding onto the button 49 after pulling out thereof, the driver in the vehicle body retains control of the cover opening, and when he desires to free the cover for further partial opening he will let go of the button 49 so that the spring 44 will shift the link 41 back for release of the pawl, so that the force of the spring 33 can complete the movement of the stud 22 to the inner end of the slot 23 for rotation of the latching lever 21 to its fully released position, as shown on Figure 3. During such swing of the lever 21 to full released position, the edge 51 of the pawl will slide down the stop abutment 50, which is sufficiently inclined for this purpose. Also, during the final movement of the lever structure 21 to its full unlatching position, the safety catch portion 21' of the lever is swung forwardly to bring its hook end 38 above the path of the keeper lip 39, the arrangement of the parts being then as shown in Figure 3.

In order to permit an attendant outside of the car to fully raise the cover for access to the interior of the hood the attendant will first raise the hood as far as the safety catch will permit and then the driver will exert a second pull on the button 49 and during such pull the pawl 24 will be fulcrumed intermediate its ends by the engagement of the edge 51 with the stop abutment 50 so that the pull will cause counterclockwise turning of the pawl and shift of the stud 22 outwardly in the slot 23 and swing of the lever structure 21 in a clockwise direction, such movement continuing until the lever 21 reassumes the position shown on Figure 2 and as indicated by the dotted lines on Figure 3. The catch hook 38 will then be out of the path of the keeper lip 39 so that the cover can be swung to its fully opened position. After such swing of the cover the button 49 is released for return of the various parts back to the position shown by full lines in Figure 3. Now when the cover is swung down for closure thereof the keeper lip 39 will engage with the inclined edge 52 of hook 38 and the lever structure 21 will be swung out of the way for passage of the keeper lip, and then the keeper wall 18 on the cover engages with arm 37 of latch lever structure 21 and the latch lever is swung by the weight of the cover toward latching position, and as soon as the stud 22 has passed through the neutral pressure line of the spring 33, the latch lever will be quickly moved or snapped to its latching position with the latching shoulder 36 thereof pressing down on the wall 18 of the cover to close and then hold the cover in closed position, the pawl 24 entering into detent engagement with the rack 27 so that the lever structure 21 is locked in latched position and the latching parts are all arranged as shown on Figure 1.

Thus, for one manipulation of the control button 49, the main latch is unlatched and the safety catch is set to catching position, while by the second manipulation of the control button the safety catch is released and the latch mechanism set to fully unlatched condition for automatic resetting thereof to cover latching condition when the cover is closed.

In some hood covers of the "alligator" type there may be considerable longitudinal play or loose motion, and therefore, to guard against release of the cover while the main latching mechanism is in partially unlatched condition and the catch hook is not yet in catching position, I provide safety means in the form of a catch shoulder 53 on the rear edge of the catch lever part 21' which will catch the wall 18 should this wall become released from the latching shoulder 36, the cover then being held against further opening movement until the latch is fully released.

When the driver of the car is entirely alone and desires access to the interior of the hood, he will manipulate the control button from the interior of the car by pulling it out and then releasing it for movement of the latching part to the position shown in Figure 3. He will then step out of the car to the front of the hood and further raise the hood as far as he can and then insert his hand in the partial opening and swing back the latch lever structure 21 far enough so that the catch hook 38 will be out of the way of the keeper lip for full release of the cover to allow complete opening thereof. When the driver is at a service station, an attendant may raise the unlatched cover until it is stopped by the safety catch and he may then manually release the safety catch or the driver may effect such release by pull on the button, so that the cover may be fully opened by the attendant.

It will be noted that the various latching parts are in the form of simple, comparatively flat sheet metal stampings, so that the latch structure may be economically manufactured and assembled.

I have shown a practical and efficient embodiment of the various features of my invention but I do not desire to be limited to the exact construction, arrangement and operation as shown and described, as changes and modifications may be made without departing from the scope of the invention.

I claim as my invention:

1. Latch mechanism for the hood structure for an automotive vehicle comprising keeper means on the hood cover, a latch bolt on the hood rockable to latching or unlatching position, an extension on said latch bolt forming a safety catch disposed out of the path of said keeper means when the cover is latched in closed position, crossover spring pressure means tending after initial swing of said latch bolt to latching or unlatching position to quickly complete such movement, a detent member on said latch bolt and a detent abutment engageable thereby when said latch bolt is in latching position to lock said latch bolt against unlatching movement, control means actuatable from outside of said hood for first releasing said detent means from said abutment means for unlocking of the latch bolt and then effecting initial swing of said latch bolt for functioning of said spring pressure means to swing the latch bolt to unlatching position and said safety catch into the path of said keeper structure for limiting the opening movement of the unlatched cover, and means effective by a second manipulation of said control means for causing said detent means to swing said latch bolt a sufficient distance in unlatching direction for withdrawal of said safety catch from the path of the keeper structure to permit full opening of the cover.

2. Latch mechanism for the hood structure of an automotive vehicle comprising keeper means on the hood cover, a latch bolt on the hood housing rockable to latching or unlatching position, an extension of said latch bolt forming a safety catch disposed out of the path of said keeper structure when the cover is latched in closed position, a detent member on said latch bolt and a detent abutment engageable thereby when said latch bolt is moved to latching position for holding the latch bolt against unlatching movement when the cover is closed, control means outside of said hood, means effective by a first manipulation of said control means and then release thereof for withdrawing said detent member from said abutment for unlocking of the latch bolt and then engagement of the detent member with the latch bolt for swing of the latch bolt to unlatching position to release the cover for opening and for setting said safety catch into the path of said keeper structure to limit further opening movement of the cover, a stop forming a fulcrum for said detent member, said detent member being engageable with said fulcrum stop by a second manipulation of said control means to cause rocking of said latch bolt a sufficient distance in latching direction to withdraw the safety catch from the path of said keeper structure to release the cover for full opening movement.

3. Latch mechanism for the hood structure of an automotive vehicle comprising keeper means on the hood cover, a latch bolt on the hood housing rockable to latching or unlatching position, an extension on said latch bolt forming a safety catch disposed out of the path of said keeper structure when the cover is latched in closed position, crossover spring pressure means tending after initial movement of said latch bolt to latching or unlatching position to quickly complete such movement, a detent member pivoted on the latch bolt and abutment means engageable thereby when the latch bolt is in latching position to lock the bolt against unlatching movement, a stop, control means outside of said hood connected with said detent member, a first pull on said control means causing said detent member to be withdrawn from said detent abutment means and engagement of the detent member with the latch bolt to swing said latch bolt in unlatching direction for continuation of such movement by said spring pressure means, pull on said detent member bringing it into engagement with said stop so that said spring pressure means is prevented from rocking said latch bolt to its full unlatching position to thereby permit only partial opening of the cover, means effective upon release of said control means for withdrawing said detent member from said stop whereby said spring pressure means may complete swing of the latch bolt to complete unlatching position and to thereby swing said safety catch into the path of said keeper structure to limit further opening of the cover, said stop after release of said control means then forming a fulcrum abutment for said detent member whereby upon a second pull of said control means said detent member will be rocked to cause swing of said latch bolt a sufficient distance in latching direction to withdraw the safety hook from the path of the keeper structure for full opening of the cover, said spring pressure means after release of the control means after the second pull thereof returning said latch bolt to its full unlatching position.

4. In a latch mechanism for the hood structure of an automotive vehicle comprising keeper means on the hood cover, a latch bolt on the hood body rockable to latching or unlatching position, cross-over spring pressure means tending, after initial movement of said latch bolt to locking or unlocking position to quickly complete such movement, said latch bolt being normally in full latching position to hold the cover closed, remote control means, actuating means movable by the movement of said control means in one direction for effecting initial movement of said latching bolt sufficient for operation of said spring-pressure means to continue the swing of the bolt toward unlatching position, stop means in the path of said actuating means for preventing said spring-pressure means from fully unlatching said latch bolt, and means effective upon release of said control means for releasing said actuating means from said stop to permit said spring-pressure means to fully unlatch said bolt.

5. Latch mechanism for the hood structure of an automotive vehicle comprising keeper means on the hood cover, a latch bolt on the hood body rockable to latching or unlatching position, spring means tending after initial movement of said bolt toward latching or unlatching position to quickly complete such movement, a detent member on said latch bolt and abutment means engageable thereby when said latch bolt is in latching position for locking said latch bolt against unlatching movement, control means outside of said hood operable to first release said detent means from said abutment means for unlocking of the latch bolt and then swing said latch bolt toward unlatching position a sufficient distance for operation of said spring-pressure means to continue such movement, stop means engaged by said detent means by the operation of said control means for preventing said spring-pressure means from effecting complete unlatching movement of said latch bolt, and means effective upon release of said control means for releasing said detent means from said stop means to permit said spring-pressure means to complete the swing of said latch bolt to full unlatching position.

6. Latch mechanism for the hood structure of an automotive vehicle comprising keeper means on the hood cover, a rockable latch bolt on the hood body normally latching the cover closed and adapted when moved toward unlatching position to effect opening movement of said cover, spring-pressure means tending after initial movement of said latch bolt toward latching or unlatching position to quickly complete such movement, a detent member on said latch bolt and abutment means engageable thereby when said latch bolt is in latching position for locking said latch bolt against unlatching movement, a control means outside of said hood operable to first release said detent means from said abutment means for unlocking of the latch bolt and then swing of said latch bolt toward unlatching position a sufficient distance for operation of said spring-pressure means to continue such movement, stop means engaged by said detent means by the operation of said control means for preventing said spring-pressure means from effecting complete unlatching movement of said latch bolt whereby said cover will be released for only partial opening by said bolt, and means effective upon release of said control means for release of said detent means from said stop means to permit said spring-pressure means to complete the swing of said latch bolt to full unlatching position for further opening of the cover.

EDWARD D. DALL.